United States Patent [19]

Kang et al.

[11] Patent Number: 4,551,391

[45] Date of Patent: Nov. 5, 1985

[54] RUBBER COMPOSITIONS AND ARTICLES THEREOF HAVING IMPROVED METAL ADHESION AND METAL ADHESION RETENTION

[75] Inventors: Jung W. Kang, Clinton; James A. Davis, Uniontown, both of Ohio

[73] Assignee: The Firestone Tire & Rubber Company, Akron, Ohio

[21] Appl. No.: 572,493

[22] Filed: Jan. 20, 1984

[51] Int. Cl.$^4$ ............................................. B32B 15/06
[52] U.S. Cl. .................................. 428/462; 428/465; 523/200; 524/406; 524/440; 524/571
[58] Field of Search ............... 428/462, 465; 523/200; 524/406, 440, 571

[56] References Cited

U.S. PATENT DOCUMENTS

| | | |
|---|---|---|
| 1,919,718 | 7/1933 | Gray . |
| 2,912,355 | 11/1959 | Formanek et al. .................. 154/130 |
| 3,905,947 | 9/1975 | Cowell et al. .................. 260/79.5 R |
| 4,258,770 | 3/1981 | Davis et al. ...................... 152/357 R |
| 4,435,477 | 3/1984 | Davis .................................. 428/462 |

FOREIGN PATENT DOCUMENTS

| | | | |
|---|---|---|---|
| 57-55981 | 4/1982 | Japan ................................... | 524/406 |
| 757039 | 9/1956 | United Kingdom ................ | 524/406 |

*Primary Examiner*—Joseph L. Schofer
*Assistant Examiner*—N. Sarofim
*Attorney, Agent, or Firm*—Daniel N. Hall

[57] ABSTRACT

Rubber compositions and metal-reinforced rubber ply members have improved metal adhesion and metal adhesion retention to brass and brass-plated metallic reinforcement. The improvement comprises admixing from about 0.5 to about 10.0 parts per hundred rubber (phr) of nickel molybdate, cobalt molybdate or a mixture thereof with a vulcanizable rubber composition prior to embedding the metallic reinforcement therein and curing. A method for improving the metal adhesion and metal adhesion retention between a vulcanizable rubber and brass or brass-plated metallic reinforcement includes the steps of dispersing from about 0.5 to about 10.0 phr of nickel molybdate, cobalt molybdate or a mixture thereof in a vulcanizable rubber composition prior to curing.

9 Claims, No Drawings

RUBBER COMPOSITIONS AND ARTICLES THEREOF HAVING IMPROVED METAL ADHESION AND METAL ADHESION RETENTION

TECHNICAL FIELD

The present invention is directed toward improving the adhesion and adhesion retention between a rubber composition, used in the manufacture of tires, conveyor belts, hoses and the like, and metallic reinforcement cord, such as steel wire and cable which commonly carries a protective coating of zinc or brass and is embedded in the stock. Flat sheets or strips of such stocks, reinforced with metal or fibers, are utilized as plies or other components of the article and are referred to in the art as rubber skim stocks. Skim refers to a relatively thin layer or coating of the rubber over the reinforcement filaments or cords. Greater thicknesses of rubber are also bonded to metal in other instances such as motor mounts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

In order for these components to function effectively, it is imperative that adhesion between the rubber and the steel cord be effectively maintained. Because steel is prone to oxidation, which even in minor degree is highly deleterious to the necessary adhesion with the rubber skim stock, often it is impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates the desirability of adding materials to rubber to improve article life and service through increased adhesion and adhesion retention. Improved adhesion between rubber and brass or the rubber skim stock and brass-plated steel is obtained according to the present invention.

BACKGROUND ART

In order to promote adhesion between rubber and ferrous metals it is known to employ a variety of metallic salts as coatings to the metal or as an ingredient in a rubber composition. Somewhat typical of the first type of art is U.S. Pat. No. 1,919,718 which discloses a rubber cement composition to be used between a layer of vulcanizable rubber and a metal surface. The cement is provided with the salt of an organic acid with cobalt, copper, manganese or lead. The composition of the cement would not be suitable as a rubber stock inasmuch as it has too low a content of carbon black and too high a content of zinc oxide. Moreover, it is carried in a solvent.

U.S. Pat. No. 2,912,355 is directed toward improving the adhesion between rubber and metal by the incorporation into a rubber composition of a calcined, partially oxidized metal salt of an aliphatic fatty acid compound, the metal being cobalt, copper, iron, lead, mercury, nickel or silver.

Finally, U.S. Pat. No. 3,905,947 is directed toward a method for improving adhesion between vulcanizable rubber and metal surfaces by incorporating an organo-nickel compound into the rubber and then vulcanizing the latter in contact with the metal surface. In no instance is an inorganic compound employed or suggested.

While others have sought to enhance adhesion between rubber compositions and metals by employing various combinations of cobalt and other metal salts with resins, the art of which has been presented herein has not disclosed the exclusive use of an inorganic salt of nickel to increase adhesion properties between rubber and brass or brass-plated metallic reinforcement.

DISCLOSURE OF INVENTION

The present invention provides a vulcanizable rubber composition having improved metal adhesion and metal adhesion retention properties with brass and brass-plated metallic reinforcing elements when cured, i.e., vulcanized, by incorporating prior to curing from about 0.5 to about 10.0 parts by weight of nickel molybdate, cobalt molybdate or a mixture thereof per 100 parts of the rubber component in the rubber composition.

The present invention further provides a metal-reinforced rubber ply to be used as a component in the construction of a manufactured rubber article such as a tire, the ply having a rubber composition and a brass-plated element bonded thereto wherein the rubber composition comprises from about 0.5 to about 10.0 parts by weight of nickel molybdate, cobalt molybdate or a mixture thereof per 100 parts of the rubber component of the rubber composition.

In the manufacture of rubber articles such as tires, several structural components are employed. Some of the structural rubber components found in a typical tire, often as one or more layers, include a tread ply skim, body ply skim, bead filler, innerliner, sidewall, stabilizer ply insert, toe filler, chafer, undertread, tread, and the like. Many of these rubber ply components can be reinforced with steel wire or cable and it is important that the bond between the rubber and the reinforcing filaments be strong.

Still further, the present invention provides a method of improving metal adhesion and metal adhesion retention properties between a vulcanizable rubber composition and brass or brass-plated metallic reinforcing elements when cured including the steps of dispersing from about 0.5 to about 10.0 parts by weight of nickel molybdate, cobalt molybdate or a mixture thereof per 100 parts of the rubber component in the rubber composition prior to curing.

PREFERRED MODE FOR CARRYING OUT THE INVENTION

To illustrate the invention, a typical example of a rubber composition with metallic reinforcement embedded therein was chosen. In particular, the example used to demonstrate the invention was a rubber skim stock which is suitable for the preparation of rubber articles such as tires. Adhesion between this stock with brass-plated steel reinforcement subsequent to vulcanization was measured and has also been presented hereinbelow.

The polymer portion of the rubber composition used in the following examples comprised 100 parts by weight of natural rubber. Polymer type, here, it not deemed to be a limitation to the practice of the instant invention. Natural rubber may also be employed in a blended state with one or more synthetic rubbers such as styrene-butadiene, synthetic isoprene or other synthetic rubbers with a natural rubber content of at least 40 to 50 percent. Further, pure forms of synthetic rubbers such as those disclosed may be used either alone or blended with other synthetic rubbers.

The preferred adhesion promoting additive utilized in the practice of the present invention is nickel molybdate, commercially available from Air Products and Chemicals, Inc. It has a molecular weight of 236.68 and nickel content of 24.8 percent.

A useful form of nickel molybdate is $NiMoO_4 \cdot H_2O$. While the salt can be dried according to known methods in the art to remove any water of hydration or other moisture, it is desirable that the salt be uncalcined as well as unoxidized during drying or before use in the present invention inasmuch as independent tests run in the laboratory of the assignee of record with calcined salts of monocarboxylic acids have established that a decrease in adhesion properties resulted in instances where the metal salt, per se, was employed to improve adhesion.

Amounts of the nickel salt employed can range from about 0.5 to about 10.0 parts per hundred parts of rubber (phr) with 1.0 to 4.0 phr and specifically 1.55 phr being preferred. In addition to the nickel salt, cobalt molybdate may be substituted in comparable amounts and mixtures of both salts can also be employed.

In order to determine the improvement in adhesion obtained when nickel molybdate is added to the rubber skim stock, T-adhesion tests (rubber-steel cord) were conducted.

The test utilized T-adhesion pads prepared by placing 60 gauge sheets of uncured fully compounded rubber skim stock on 51 gauge fabric reinforced rubber backing. Commercial brass-coated wires (1×5×0.25 mm diam.) were placed between two pads of the reinforced skim stock with the wires in contact with the uncured rubber skim at 1.25 cm intervals. The width of each adhesion pad was 1.25 cm. The pads were placed in a mold and were cured for 30 minutes at 149° C. Testing was done on a Model 1130 Instron Universal Tester at a crosshead speed of 25.4 cm per minute with samples preheated for 20 minutes at 110° C. prior to testing. Oven aging of the cured T-adhesion pads was done in a forced air oven at 121° C. for two days. Steam bomb aging of the cured samples was done in a pressure tight bomb for one hour at 149° C., in a saturated steam atmosphere.

DETAILED T-ADHESION TEST PROCEDURE

1. Using a Clicker machine and a 15.24×1.25 cm die, prepare an adequate number of calendered and control stock samples for T-adhesion pad building.
2. Use one piece of calendered fabric reinforced rubber backing (0.1295 cm).
3. Ply one piece of 60 gauge control rubber skim stock (0.1524 cm) onto the fabric backing.
4. Place sample in building jig with fabric side down.
5. Place ten cords (of brass or zinc coated wire) approximately 17.78 cm in length equally spaced on top of the two piece assembly.
6. Invert another 2 ply assembly, made as in items 1, 2 and 3, on top of cords so that cords are between the two layers of rubber skim stock to be tested.
7. This assembly should now fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.350 to obtain kilonewtons per meter.

In the tests which follow, a rubber skim stock, composition A, was prepared which did not contain the adhesion promoting ingredients of the present invention. Rubber composition B was prepared exactly as was composition A except that they contained 1.55 phr of nickel molybdate according to the present invention. Formulations for each are as follows with all parts given on the basis of parts per hundred parts of rubber (phr) by weight.

| Compounding Ingredients | Composition A |
|---|---|
| Natural Rubber (E grade) | 100 |
| HAF Black | 60 |
| Zinc Oxide | 7.5 |
| Stearic Acid | 0.50 |
| Santoflex DD[1] | 1.0 |
| Hydrocarbon resin | 2.0 |
| Sundex 790 oil | 2.0 |
| NOBS Special accelerator[2] | 0.70 |
| Santoflex 13[3] | 1.0 |
| Sulfur MB[4] | 7.50 |
| Santogard PVI[5] | 0.4 |

[1]6-dodecyl-1,2-dihydro-2,2,4-trimethylquinoline
[2]N—oxydiethylene-2-benzothiazole sulfenamide (NOBS Special accelerator)
[3]N—(1,3-dimethylbutyl)-N'—phenyl-p-phenylenediamine
[4]80/20 sulfur/extender oil preblend, with a naphthenic oil in the range of 18-22% oil. The sulfur is a yellow powder, 89.5% min. of which is insoluble sulfur.
[5]N—(cyclohexylthio)phthalamide It is to be understood that the foregoing composition of the rubber skim stock has been presented solely to enable those skilled in the art to have at least one rubber skim stock with which to practice the invention. As such, the present invention is not to be limited only to this specific formulation.

The two compositions were each used to build T-adhesion pads with brass-plated steel cord. Three sets of tests were conducted on each of the two stocks for comparison. Table I shows the results of the testing under normal, oven aged and steam bomb aged conditions. The force necessary to pull or remove the metallic reinforcement from the vulcanized rubber skim stock is given first, in KN/m, followed by the percent of rubber skim stock remaining on the surface of the metallic reinforcement. The amount of rubber skim stock remaining on the metallic reinforcement was determined by visual examination and has been reported as % rubber coverage.

TABLE I

| Short Term Aged Steelcord T-Adhesion Tests | | |
| --- | --- | --- |
| Rubber Compositions | A | B |
| Nickel molybdate, phr | — | 1.55 |
| Test A | | |
| Normal (Unaged)[a] | | |
| Brass-plated cord | | |
| KN/m | 26.99 | 24.78 |
| % rubber coverage | 95 | 85 |
| Test B | | |
| Oven Aged[b] | | |
| Brass-plated cord | | |
| KN/m | 18.9 | 13.83 |
| % rubber coverage | 90 | 85 |
| Test C | | |
| Steam Bomb Aged[c] | | |
| Brass-plated cord | | |
| KN/m | 18.38 | 24.85 |
| % rubber coverage | 80 | 95 |

[a]T-adhesion pads cured 30 minutes at 149° C. and tested at 110° C.
[b]T-adhesion pads cured 30 minutes at 149° C., heat aged in forced air oven for 2 days at 121° C. and tested at 110° C.
[c]T-adhesion pads cured 30 minutes at 149° C., aged in a pressure tight bomb for one hour at 149° C. in a saturated steam atmosphere and tested at 110° C.

As can be determined from Table I, Test A, adhesion of composition B to brass-plated steel cord was substantially as good as for composition A. As can be seen from Test B, composition B showed slightly less adhesion than the control but exhibited excellent coverage.

Finally, the effect of steam bomb aging is presented in Test C. Here, a significant improvement in adhesion and rubber coverage was observed for composition B as compared with the control, composition A.

The rubber coverage measurement is deemed to be significant in that it visually represents the increased adhesion of the rubber composition to the plated steel cord. As is well known to those skilled in the art, the amount of rubber left adhering to the steel cord after it has been pulled from a cured T-adhesion pad represents the relationship of the adhesion force attaching the rubber composition to the surface of the steel cord and the tear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Normal or unaged testing is merely a measurement of the initial adhesive properties between the rubber composition and the metallic reinforcement. The oven aging test is an accelerated heat aging test and is significant in determining the effect of heat on the thermal stability of the chemical bonds formed between the rubber composition and the metallic reinforcement during vulcanization. Steam bomb aging for one hour at 149° C. is an accelerated humidity aging test and is significant in determining the chemical stability of the chemical bonds formed between the rubber skim stock and the metallic reinforcement when exposed to moisture or steam under pressure.

Based on the foregoing results reported in Table I, the presence of nickel molybdate in a rubber skim stock has been shown to be effective in promoting adhesion between the rubber skim stock and brass-plated metallic reinforcement. As stated hereinabove, the rubber can be natural or synthetic or a blend and formulated as a rubber stock or a skim stock. Also, the metallic reinforcement employed in the practice of the invention can be in the form of a strand, mat, web, ply or braid.

The present invention also finds utility in, for example, other rubber articles bonded to brass or brass-plated steel such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied with the scope of the total specification disclosure by selection of various other components as well as the amounts thereof so long as nickel molybdate is employed, and it is believed that practice of the present invention can be determined without departing from the spirit of the invention herein disclosed and described, the scope of the invention being limited solely by the scope of the attached claims.

We claim:

1. A vulcanizable rubber composition devoid of rosin-derived resins having improved metal adhesion and metal adhesion retention properties with brass and brass-plated metallic reinforcing elements, the improvement wherein:

from about 0.5 to about 10.0 parts by weight of nickel molybdate, cobalt molybdate or a mixture thereof per 100 parts of the rubber component in said rubber composition is incorporated into said rubber composition prior to curing.

2. A rubber composition as set forth in claim 1, wherein the amount of nickel molybdate employed is 1.55 parts per 100 parts of rubber.

3. A rubber composition as set forth in claim 1, wherein said rubber is selected from the group consisting of natural rubber, synthetic rubber and blends thereof.

4. A method for improving metal adhesion and metal adhesion retention properties between a vulcanizable rubber composition devoid of rosin-derived resins and brass or brass-plated metallic reinforcing elements comprising the step of:

dispersing from about 0.5 to about 10.0 parts by weight of nickel molybdate, cobalt molybdate or a mixture thereof per 100 parts of the rubber component in said rubber composition prior to curing.

5. A method as set forth in claim 4, wherein the amount of nickel molybdate employed is 1.55 parts per 100 parts of rubber.

6. A method as set forth in claim 4, wherein said rubber is selected from the group consisting of natural rubber, synthetic rubber and blends thereof.

7. A metal-reinforced rubber ply to be used as an element in a manufactured rubber article, said ply having a rubber composition and a brass-plated element bonded thereto wherein said rubber composition is made by curing a composition comprising:

a vulcanizable rubber devoid of rosin-derived resins; and from about 0.5 to about 10.0 parts by weight of nickel molybdate, cobalt molybdate or a mixture thereof per 100 parts of the rubber component in said rubber composition.

8. A metal-reinforced rubber ply, as set forth in claim 7, wherein the amount of nickel molybdate employed is 1.55 parts per 100 parts of rubber.

9. A metal-reinforced rubber ply, as set forth in claim 7, wherein said rubber is selected from the group consisting of natural rubber, synthetic rubber and blends thereof.

* * * * *